US 8,578,152 B2
Nov. 5, 2013

(12) United States Patent
Parkinson

(54) METHODS, SYSTEMS, AND APPARATUS FOR STAGGERED RENEWAL PERIODS

(75) Inventor: Steven William Parkinson, San Jose, CA (US)

(73) Assignee: Red Hat, Inc., Raleigh, NC (US)

(*) Notice: Subject to any disclaimer, the term of this patent is extended or adjusted under 35 U.S.C. 154(b) by 1285 days.

(21) Appl. No.: 11/765,861

(22) Filed: Jun. 20, 2007

(65) Prior Publication Data
US 2008/0320569 A1    Dec. 25, 2008

(51) Int. Cl.
*H04L 29/06* (2006.01)

(52) U.S. Cl.
USPC ........... 713/158; 713/150; 713/156; 713/173; 726/21

(58) Field of Classification Search
USPC .............................................. 71/158; 713/158
See application file for complete search history.

(56) References Cited

U.S. PATENT DOCUMENTS

| 3,790,768 | A | * | 2/1974 | Chevalier et al. | 708/251 |
| 5,644,722 | A | * | 7/1997 | Miyamoto et al. | 705/9 |
| 6,934,855 | B1 | * | 8/2005 | Kipnis et al. | 726/20 |
| 7,343,297 | B2 | * | 3/2008 | Bergler et al. | 705/59 |
| 7,397,922 | B2 | * | 7/2008 | Gavrilescu et al. | 380/255 |
| 7,415,607 | B2 | * | 8/2008 | Sinn | 713/158 |
| 7,650,496 | B2 | * | 1/2010 | Thornton et al. | 713/158 |
| 7,650,497 | B2 | * | 1/2010 | Thornton et al. | 713/158 |
| 7,653,810 | B2 | * | 1/2010 | Thornton et al. | 713/158 |
| 2002/0194010 | A1 | * | 12/2002 | Bergler et al. | 705/1 |
| 2003/0028454 | A1 | * | 2/2003 | Ooho et al. | 705/32 |
| 2005/0114653 | A1 | * | 5/2005 | Sudia | 713/158 |
| 2009/0058822 | A1 | * | 3/2009 | Chaudhri | 345/173 |

* cited by examiner

*Primary Examiner* — Carl Colin
*Assistant Examiner* — Gary Lavelle
(74) *Attorney, Agent, or Firm* — Lowenstein Sandler LLP

(57) ABSTRACT

An embodiment relates generally to receiving a plurality of security certificates for each user of a plurality of users and generating a random renewal period for a selected security certificate. The method also includes associating the random renewal period to the selected security certificate and providing the selected security certificate with the random renewal period to the respective user of the plurality of users.

19 Claims, 4 Drawing Sheets ously understood with reference to the following detailed description of the embodiments when considered in connection with the accompanying figures, in which:

METHODS, SYSTEMS, AND APPARATUS FOR STAGGERED RENEWAL PERIODS

FIELD

This invention relates generally to certificates, more particularly, to methods, systems and apparatus for staggered renewal period for the certificates.

DESCRIPTION OF THE RELATED ART

It is generally known that Public Key Infrastructure ("PKI") can enable users of a basically unsecured public network such as the Internet to securely and privately exchange data and/or money through the use of a public and a private cryptographic key pair that is obtained and shared through a trusted authority. The public key infrastructure provides for a digital certificate that can identify an individual or an organization and directory services that can store and, when necessary, revoke the certificates.

The digital certificate can be generally regarded as an electronic "credit card" that establishes the credentials of a user when doing business or other transactions on the Internet. The digital certificate can be issued by a certification authority (CA). The digital certificate can contain the name of the user, a serial number, expiration dates, a copy of the certificate holder's public key (used for encrypting messages and digital signatures), and the digital signature of the certificate-issuing authority so that a recipient can verify that the certificate is real. Some digital certificates conform to a standard, such as X.509. Digital certificates can be kept in registries so that authenticating users can look up other users' public keys.

When rolling out a new PKI deployment to a large set of users in a short period of time (typically, the 24 hours following an email announcement), it is a common practice to issue all certificates with the same validity period. A typical validity period is one year. As a consequence of this common practice, all the certificates expire at the same time or within a small window of time. A significant support burden will be incurred suddenly after that one year interval to maintain the access for the users, that is, to renew all the certificates that were issued the year prior.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of secure computing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods, systems, and apparatus for distributing certificate validity periods among multiple certificates. More particularly, for a large deployment of certificates, a staggered renewal module may be configured to assign each certificate a validity period based on a random value. The staggered renewal module may include a random number generator configured to generate a random number based on a seed value. The seed value may be retrieved from the generated certificate, a unique identifier for the server implementing the staggered renewal module or other similar unique identifier. In other embodiments, other mathematical functions, such as a Poisson distribution, may be used to generate the value for the renewal period. Accordingly, by randomly distributing or statistically staggering the renewal periods for certificates, the workload in renewing the certificates can be distributed tailored for the anticipated workload of the support personnel.

Figure 1:
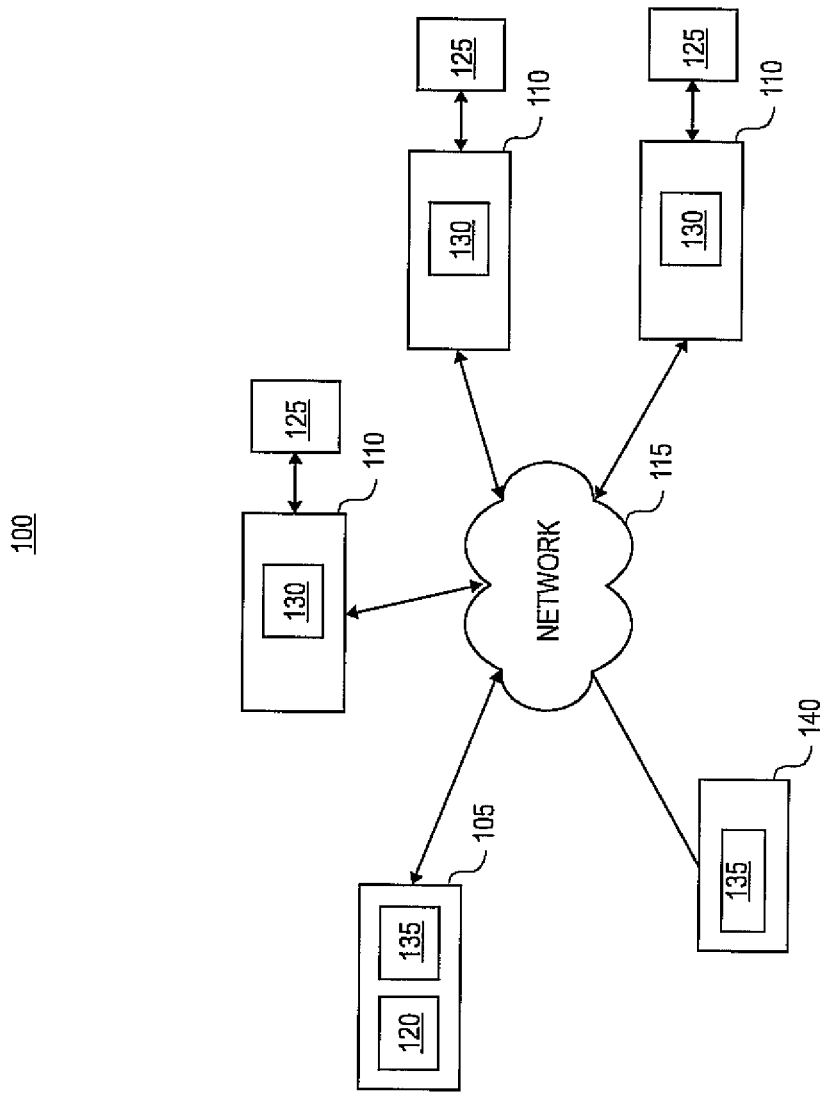
FIG. 1 illustrates an exemplary system in accordance with an embodiment.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a multiple user operating system (not shown) in conjunction with the clients 110. The server 105 may be implemented with server platforms as known to those skilled in the art from Intel, Advanced Micro Devices, Hewlett-Packard, Dell, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 can be computing machine or platform configured to execute secure and open applications through the multi-user operating system. The clients 110 may be implemented with personal computers, workstations, thin clients, thick clients, or other similar computing platform. The clients 110 can use operating systems such as Linux, Windows, Macintosh or other available operating system.

Returning to the server 105, the server 105 can store and execute a certificate authority module 120. The certificate authority module 120 can be configured to receive certificate requests from the clients 110, authenticate the requesting client and issue valid certificates to the requesting client in response to a proper authentication. The certificate authority module 120 can comply with X.509 standards when issuing certificates. In some embodiments, the certificate authority module 120 can be implemented on a separate server such as certificate server 140.

The certificate authority module 120 can also be configured to interface with a staggered renewal module 135. More particularly, in accordance with various embodiments, the staggered renewal module 135 may be configured to generate a renewal period for a selected certificate based on a mathematical function. In some embodiments, the mathematical function may be a random number generator, a statistical function (e.g., Poisson distribution) or other similar mathematical function to generate non-consecutive numbers. The staggered renewal module 135 may be configured to determine the length of the renewal period based on the mathematical function and a renewal date for the selected certificate. Accordingly, a first certificate has a different renewal date from a second certificate. Thus, support personnel may process renewal requests for certificates over a longer period of time versus being overburdened in a short period as with conventional methods.

In other embodiments, the staggered renewal module 135 may be configured to further enhance the resource management by maintaining a list of excluded dates. An excluded date may be a date where the support personnel may not support the user, such as a holiday, vacation, etc. The staggered renewal module 135 may be configured to compare the renewal date against the list of excluded dates. If there is a match between the renewal date and an excluded list, the staggered renewal module 135 may be configured to change the renewal date to a next working day or generate a new renewal date for the selected certificate.

Figure 2:
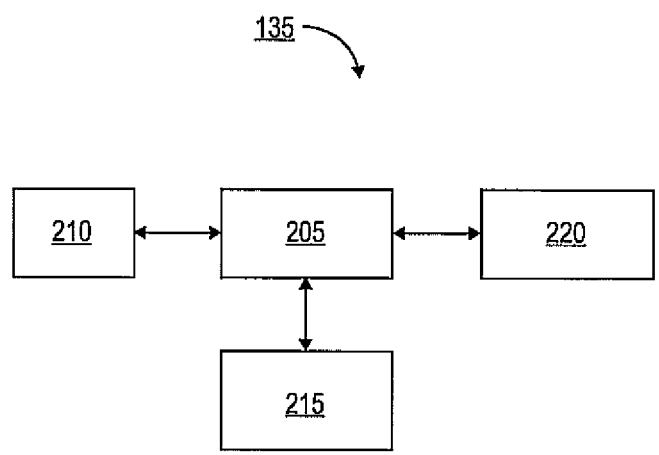
FIG. 2 illustrates an exemplary staggered renewal module in accordance with yet another embodiment.

FIG. 2 illustrates an exemplary block diagram of the staggered renewal module 135 in accordance with an embodiment. It should be readily apparent to those of ordinary skill in the art that staggered renewal module 135 depicted in FIG. 2 represents a generalized schematic illustration and that other components may be added or existing components may be removed or modified. Moreover, the staggered renewal module 135 may be implemented using software components, hardware components, or combinations thereof.

As shown in FIG. 2, the staggered renewal module 135 may include a control module 305, an input/output (I/O) interface 210, a random number generator 215 and a memory 220. The control module 205 may be configured to implement a computer program application that provides the functionality of the staggered renewal module 135. The control module 205 may be implemented with an application specific integrated circuit, a field programmable gate array, a microprocessor, a microcontroller or other similar computing platform.

The control module 205 may interface with the I/O interface 210. The I/O interface 210 may provide a communication channel for the control module 205 to receive a certificate or a certificate request. The I/O interface 210 may also provide a communication channel to provide a renewal date for a certificate. The I/O interface 210 may be implemented as a hardware interface (e.g., PCI, SCSI, SPI or other bus interfaces) or as a software interface.

The control module 205 may also interface with random number generator 215. The random number generator 215 may be configured to generate a random number based on algorithms and/or circuits known to those skilled in the art. The random number generator 215 may use a default seed value or the control module 205 may provide a seed value to the random number generator in some embodiments.

The control module 205 may further be coupled to the memory 220. The memory 220 may be configured to provide a location for the staggered renewal module 135 to store excluded dates. As described earlier, an excluded date may be a date where support personnel are not on duty due to holiday, travel, vacation, etc. The memory 220 may also store the applet that provides the functionality of the control module 205 as well as scratch pad memory for the control module 205.

Figure 3:
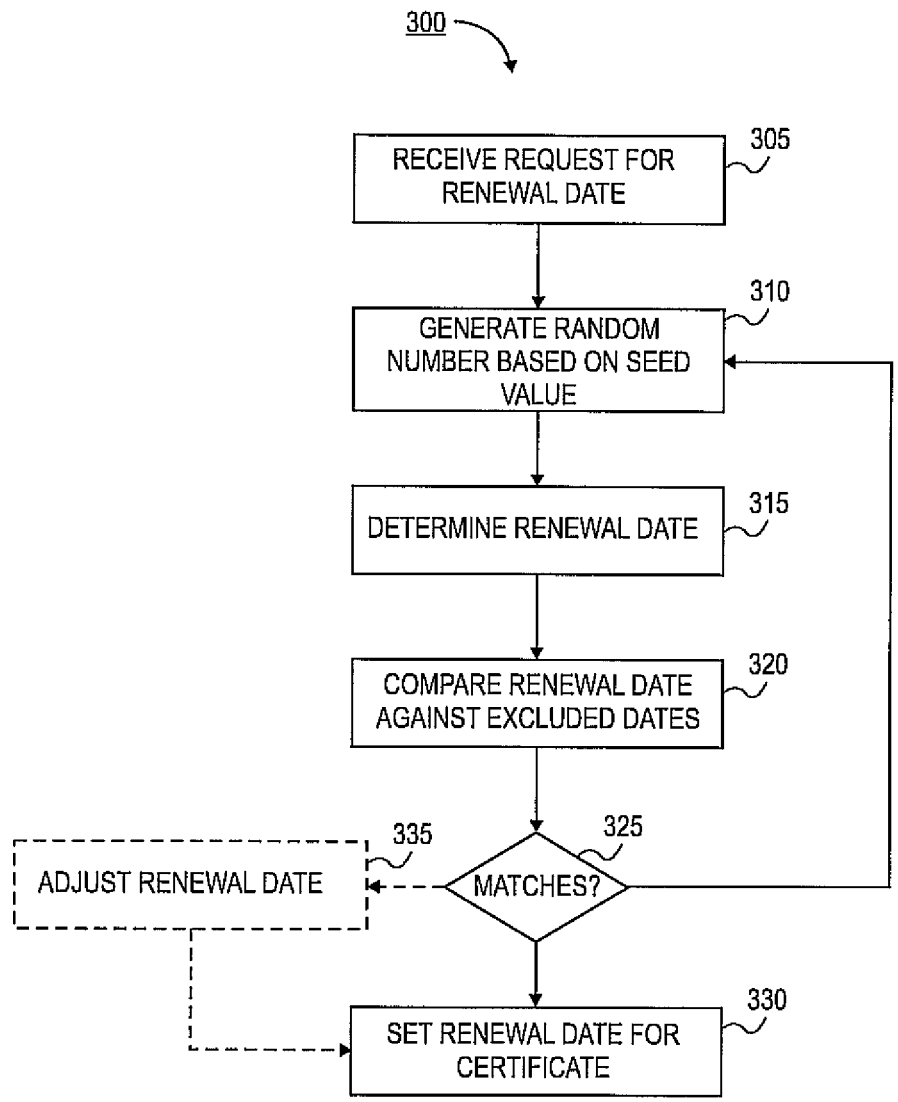
FIG. 3 illustrates an exemplary flow diagram implemented by the staggered renewal module in accordance with yet another embodiment.
Figure 4:
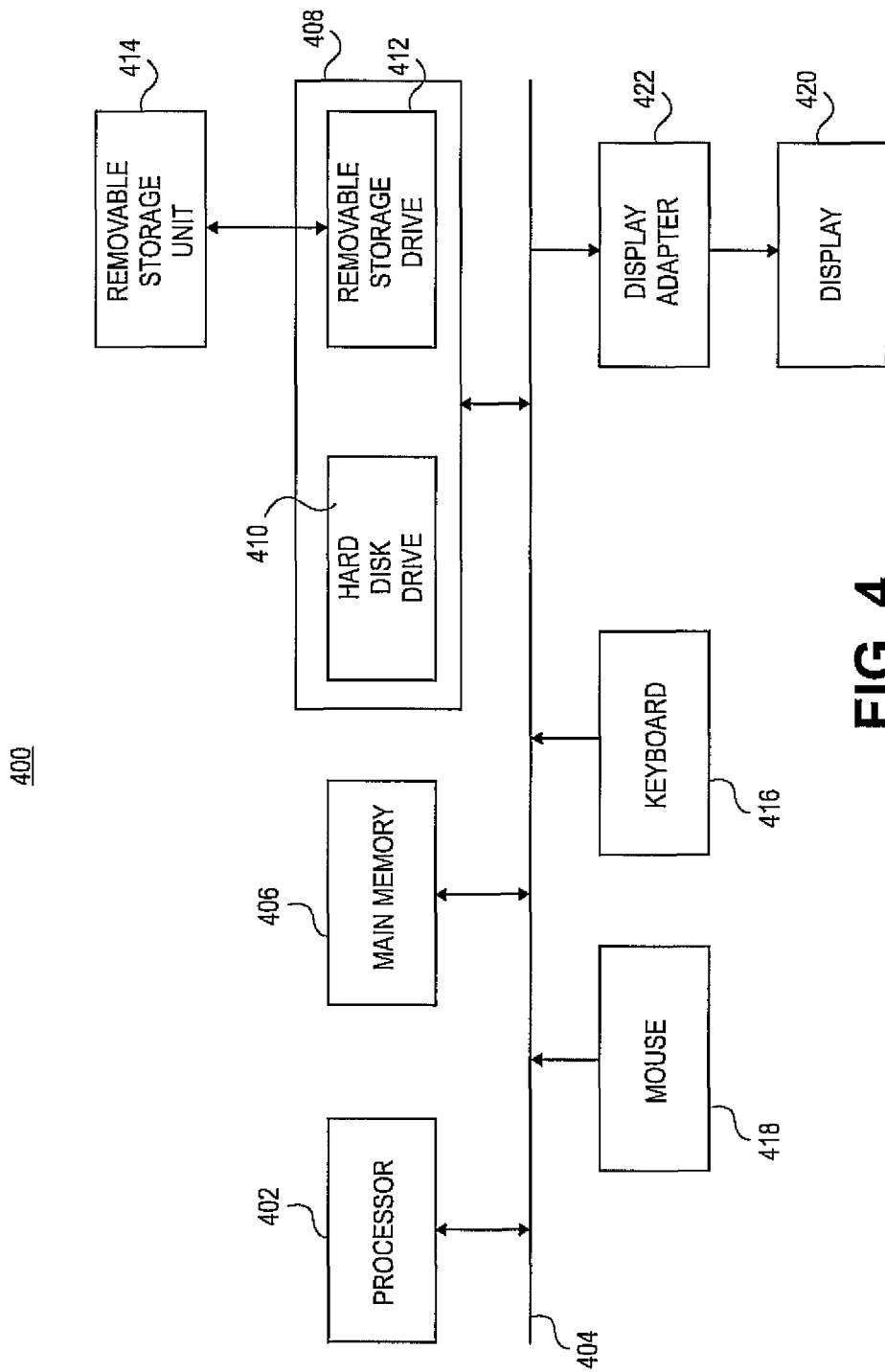
FIG. 4 illustrates an exemplary computing platform.

FIG. 3 illustrates an exemplary flow diagram executed by the staggered renewal module 135 in accordance with yet another embodiment. It should be readily apparent to those of ordinary skill in the art that the flow diagram 300 depicted in FIG. 4 represents a generalized schematic illustration and that other steps may be added or existing steps may be removed or modified.

As shown in FIG. 3, the control module 205 may be configured to receive a request for a renewal date over the I/O interface 210, in step 305. In yet other embodiments, a user may invoke the staggered renewal module 135 by menu selection or command line prompt.

In step 310, the control module 205 may request a random number from the random number generator 215. In step 315, the control module 215 may then tale the random number value and calculate a renewal date for the selected certificate based on the random number value.

In step 320, the control module 215 may determine whether the renewal date matches any of the excluded dates stored in the memory 320. In step 325, if there is a match with any of the excluded dates, the control module 205 may return to step 310 to request another renewal date. Otherwise, the control module 205 may set the renewal date for the selected certificate.

Alternatively, if there is a match to any of the excluded dates, the control module 205 may adjust the renewal date, in step 435. More particularly, the control module 205 may apply a heuristic or algorithm to adjust the date forward or backward to avoid the conflict with an excluded date. For example, the control module 205 may implement an algorithm of moving a renewal date that matches an excluded date to the next business work day.

FIG. 4 illustrates an exemplary block diagram of a computing platform 400 where an embodiment may be practiced. The functions of the staggered renewal module and token management system may be implemented in program code and executed by the computing platform 400. The staggered renewal module and token management system may be implemented in computer languages such as PASCAL, C, C++, JAVA, etc.

As shown in FIG. 4, the computing platform 400 includes one or more processors, such as processor 402 that provide an execution platform for embodiments of the staggered renewal module and token management system. Commands and data from the processor 402 are communicated over a communication bus 404. The computing platform 400 also includes a main memory 406, such as a Random Access Memory (RAM), where the staggered renewal module and token management system may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the staggered renewal module and token management system may be stored. The removable storage drive 412 reads from and/or writes to a removable storage unit 414 in a well-known manner A user interfaces with the staggered renewal module and token management system with a keyboard 416, a mouse 418, and a display 420. A display adapter 422 interfaces with the communication bus 404 and the display 420. The display adapter also receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
    generating, by a processor, a random renewal period with a renewal date for a digital certificate;
    retrieving a seed value from the digital certificate;
    generating a random value in view of the retrieved seed value;
    generating a second random renewal period for the digital certificate in view of the random value in response to the renewal date matching one of a plurality of excluded dates;
    associating the second random renewal period with the digital certificate; and
    providing the digital certificate with the second random renewal period to a user.

2. The method of claim 1, further comprising:
    determining the renewal date for the random renewal period.

3. The method of claim 2, further comprising:
    determining the plurality of excluded dates for the digital certificate; and
    comparing the renewal date with each excluded date of the plurality of excluded dates.

4. The method of claim 1, further comprising determining a second renewal date for the second random renewal period.

5. The method of claim 1, further comprising generating the random renewal period in view of a mathematical function.

6. The method of claim 5, wherein the mathematical function is a random number generator.

7. The method of claim 5, wherein the mathematical function is a Poisson distribution function.

8. An apparatus comprising:
    a memory containing operations, the processor to execute operations to perform the method of claim 1.

9. A non-transitory computer-readable medium comprising operations for causing the processor to perform the method of claim 1.

10. An apparatus comprising:
    a processor to execute a function module and a manager module, the function module to generate a value; and
    the manager module to:
    receive a digital certificate,
    determine a random renewal period for the digital certificate, in view of the value generated by the function module,
    set a renewal date for the digital certificate for a user to renew the digital certificate,
    retrieve a seed value from the digital certificate;
    generate a random value in view of the retrieved seed value; and
    determine, in view of the random value, a second random renewal period for the digital certificate in response to the renewal date matching one of a plurality of excluded dates.

11. The apparatus of claim 10, wherein the function module calculates a random value for the random renewal period.

12. The apparatus of claim 10, wherein the function module determines a distributed value for random renewal period.

13. The apparatus of claim 10, further comprising a memory coupled to the processor, the memory to store the plurality of excluded dates.

14. The apparatus of claim 13, the manager module to associate the second random renewal period with the digital certificate in response to the renewal date matching one of the plurality of excluded dates.

15. A system comprising:
    a certificate system to manage digital certificates and associated users and to generate a digital certificate for a user; and
    a processor coupled to the certificate system to:
    execute a renewal module, the renewal module to receive the digital certificate from the certificate system,
    determine a random renewal period for the digital certificate,
    set a renewal date for the digital certificate for the user to renew the digital certificate in view of the random renewal period,
    retrieve a seed value from the digital certificate;
    generate a random value in view of the retrieved seed value; and
    determine, in view of the random value, a second random renewal period for the digital certificate in response to the renewal date matching one of a plurality of excluded dates.

16. The system of claim 15, wherein the renewal module calculates a random value for the random renewal period.

17. The system of claim 15, wherein the renewal module determines a distributed value for the random renewal period.

18. The system of claim 15, wherein the renewal module is further configured to compare the renewal date with each excluded date of the plurality of excluded dates.

19. The system of claim 18, the renewal module to associate the second random renewal period with the digital certificate in response to the renewal date matching one of the plurality of excluded dates.

* * * * *